(12) United States Patent
Claon (10) Patent No.: US 12,011,023 B1
(45) Date of Patent: Jun. 18, 2024

(54) BREAKFAST FLAKES WITH HIGH PROTEIN CONTENT

(71) Applicant: Post Consumer Brands, LLC, Lakeville, MN (US)

(72) Inventor: Paul-Armand Claon, Lakeville, MN (US)

(73) Assignee: Post Consumer Brands, LLC, Lakeville, MN (US)

( * ) Notice: Subject to any disclaimer, the term of this patent is extended or adjusted under 35 U.S.C. 154(b) by 11 days.

(21) Appl. No.: 17/738,732

(22) Filed: May 6, 2022

Related U.S. Application Data (60) Provisional application No. 63/227,797, filed on Jul. 30, 2021.

(51) Int. Cl.
  *A23L 7/135* (2016.01)
  *A23J 3/18* (2006.01)
  (Continued)

(52) U.S. Cl.
  CPC ............... *A23L 7/135* (2016.08); *A23J 3/18* (2013.01); *A23J 3/26* (2013.01); *A23L 33/185* (2016.08);
  (Continued)

(58) Field of Classification Search
  CPC ........ A23L 7/135; A23L 33/19; A23L 33/185; A23P 30/38; A23P 30/20; A23J 3/18; A23J 3/26; A23V 2002/00
  See application file for complete search history.

(56) References Cited

U.S. PATENT DOCUMENTS

| 3,814,824 A | 6/1974 | Bedenk et al. |
| 5,709,902 A * | 1/1998 | Bartolomei ............. A23L 7/135 426/94 |

(Continued)

FOREIGN PATENT DOCUMENTS

AU   2016355306   8/2020

OTHER PUBLICATIONS

Sumithra, et al. "Toasting of corn flakes: Product characteristics as a function of processing conditions", Journal of Food Engineering, 88 (2008), 419-428. https://doi.org/10.1016/j.jfoodeng.2008.03.001 (Year: 2008).*

(Continued)

*Primary Examiner* — Amber R Orlando
*Assistant Examiner* — Deborah Liu
(74) *Attorney, Agent, or Firm* — Pauly, DeVries Smith & Deffner LLC (57) ABSTRACT

Embodiments herein relate to high protein, ready-to-eat breakfast flakes. In an embodiment, a method of making high protein flakes is included. The method can include forming an ingredient mixture comprising wheat gluten, wheat protein isolate, and pea protein concentrate, amongst other ingredients. The method can also include extruding the ingredient mixture to produce extruded pellets and flaking the extruded pellets to produce wet flakes. In an embodiment, a high protein flaked food product is included herein. The high protein flaked food product can include a plurality of high protein flakes. The high protein flakes can include wheat gluten, wheat protein isolate, and pea protein concentrate, amongst other ingredients. The high protein flakes have an average protein content of at least 50% by weight or higher. Other embodiments are also included herein.

13 Claims, 4 Drawing Sheets

(51) Int. Cl.
  *A23J 3/26* (2006.01)
  *A23L 33/185* (2016.01)
  *A23L 33/19* (2016.01)
  *A23P 30/20* (2016.01)
  *A23P 30/38* (2016.01)

(52) U.S. Cl.
  CPC .............. *A23L 33/19* (2016.08); *A23P 30/20* (2016.08); *A23P 30/38* (2016.08); *A23V 2002/00* (2013.01)

(56) References Cited

U.S. PATENT DOCUMENTS

| | | |
|---|---|---|
| 6,303,177 B1 | 10/2001 | Ning et al. |
| 7,235,276 B2 | 6/2007 | Allen et al. |
| 10,681,926 B2 | 6/2020 | Hossen et al. |
| 2004/0043128 A1 | 3/2004 | Duffy et al. |
| 2012/0315359 A1 | 12/2012 | Gandhi et al. |
| 2019/0269151 A1* | 9/2019 | Solorio .................. A21D 13/04 |

OTHER PUBLICATIONS

Charrondiere, et al. FAO/INFOODS Density Database, https://www.fao.org/3/ap815e/ap815e.pdf (Year: 2012).*

* cited by examiner

BREAKFAST FLAKES WITH HIGH PROTEIN CONTENT

This application claims the benefit of U.S. Provisional Application No. 63/227,797, filed Jul. 30, 2021, the content of which is herein incorporated by reference in its entirety.

FIELD

Embodiments herein relate to high protein flakes and methods of creating the same. More specifically, embodiments herein relate to high protein, ready-to-eat breakfast flakes.

BACKGROUND

High protein diets have become popular. Eating protein helps a person feel full, which can lead to them eating fewer calories overall. High protein diets can also provide sustained energy and support muscle maintenance and growth. High protein diets typically include large quantities of protein and only a relatively small amount of carbohydrate. Food items with high protein content have become very popular with consumers even amongst those following other types of diets.

Breakfast cereals were first introduced in the 1800s and are extremely popular today as they provide both convenience, as ready-to-eat food products, along with pleasing flavors and textures. Many breakfast cereals contain substantial carbohydrate content.

SUMMARY

Embodiments herein relate to high protein, ready-to-eat breakfast flakes. In a first aspect, a method of making high protein flakes can be included. The method can include forming an ingredient mixture. The ingredient mixture can include wheat gluten, wheat protein isolate, and pea protein concentrate. The method can further include extruding the ingredient mixture to produce extruded pellets and flaking the extruded pellets to produce wet flakes.

In a second aspect, in addition to one or more of the preceding or following aspects, or in the alternative to some aspects, the wheat protein isolate and the pea protein concentrate can be in a ratio of 2:1 to 1:2 by weight.

In a third aspect, in addition to one or more of the preceding or following aspects, or in the alternative to some aspects, the ingredient mixture can include dairy protein.

In a fourth aspect, in addition to one or more of the preceding or following aspects, or in the alternative to some aspects, the method can further include adding a pregelatinized or precooked starch to the ingredient mixture.

In a fifth aspect, in addition to one or more of the preceding or following aspects, or in the alternative to some aspects, the pregelatinized or precooked starch can include at least one of a pregelatinized corn starch, a pregelatinized rice starch, a pregelatinized potato flour, a pregelatinized tapioca flour, and a precooked pulse flour.

In a sixth aspect, in addition to one or more of the preceding or following aspects, or in the alternative to some aspects, the method can further include puffing and toasting the wet flakes to produce finished flakes.

In a seventh aspect, in addition to one or more of the preceding or following aspects, or in the alternative to some aspects, the finished flakes can have a protein content of at least 50 wt. %.

In an eighth aspect, in addition to one or more of the preceding or following aspects, or in the alternative to some aspects, the finished flakes can have a protein content of at least 60 wt. %.

In a ninth aspect, in addition to one or more of the preceding or following aspects, or in the alternative to some aspects, the finished flakes can have a moisture content of 1 to 5 wt. %.

In a tenth aspect, in addition to one or more of the preceding or following aspects, or in the alternative to some aspects, the finished flakes can have a moisture content of 2 to 3 wt. %.

In an eleventh aspect, in addition to one or more of the preceding or following aspects, or in the alternative to some aspects, the finished flakes can have a bulk density of 96 to 136 g/L.

In a twelfth aspect, in addition to one or more of the preceding or following aspects, or in the alternative to some aspects, the finished flakes can have a bulk density of 108 to 120 g/L.

In a thirteenth aspect, in addition to one or more of the preceding or following aspects, or in the alternative to some aspects, the ingredient mixture can include from 33 to 44 weight percent of the wheat gluten, from 17 to 37 weight percent of the wheat protein isolate, and from 15 to 35 weight percent of the pea protein concentrate, and wherein the preceding weight percentages can be with respect to a total weight of the wheat gluten, the wheat protein isolate, and the pea protein concentrate.

In a fourteenth aspect, in addition to one or more of the preceding or following aspects, or in the alternative to some aspects, the ingredient mixture can include from 36 to 41 weight percent of the wheat gluten, from 30 to 34 weight percent of the wheat protein isolate, and from 27 to 32 weight percent of the pea protein concentrate, and wherein the preceding weight percentages can be with respect to a total weight of the wheat gluten, the wheat protein isolate, and the pea protein concentrate.

In a fifteenth aspect, in addition to one or more of the preceding or following aspects, or in the alternative to some aspects, the wheat protein isolate can have a pH of less than 5.0.

In a sixteenth aspect, in addition to one or more of the preceding or following aspects, or in the alternative to some aspects, the wheat protein isolate can have a pH of 4.0 or less.

In a seventeenth aspect, in addition to one or more of the preceding or following aspects, or in the alternative to some aspects, the wheat gluten, the wheat protein isolate, and the pea protein concentrate, in combination, have a pH of less than 5.0.

In an eighteenth aspect, in addition to one or more of the preceding or following aspects, or in the alternative to some aspects, the wheat gluten, the wheat protein isolate, and the pea protein concentrate, in combination, have a pH of 4.0 or less.

In a nineteenth aspect, in addition to one or more of the preceding or following aspects, or in the alternative to some aspects, the method can further include adding glycerol monostearate to the ingredient mixture.

In a twentieth aspect, in addition to one or more of the preceding or following aspects, or in the alternative to some aspects, the extruded pellets can have a density of 475 to 700 g/L.

In a twenty-first aspect, in addition to one or more of the preceding or following aspects, or in the alternative to some aspects, the extruded pellets can have a density of 450 to 650 g/L.

In a twenty-second aspect, in addition to one or more of the preceding or following aspects, or in the alternative to some aspects, the extruded pellets can have a moisture content of 27 to 30 wt. percent.

In a twenty-third aspect, in addition to one or more of the preceding or following aspects, or in the alternative to some aspects, the wet flakes can have a thickness of 10 to microns.

In a twenty-fourth aspect, in addition to one or more of the preceding or following aspects, or in the alternative to some aspects, the wet flakes can have a moisture content of 26 to 31 wt. percent.

In a twenty-fifth aspect, in addition to one or more of the preceding or following aspects, or in the alternative to some aspects, the wet flakes can have a moisture content of 26 to 29 wt. percent.

In a twenty-sixth aspect, in addition to one or more of the preceding or following aspects, or in the alternative to some aspects, the extruded pellets can be at a temperature of 80 to 200 degrees Fahrenheit before flaking.

In a twenty-seventh aspect, in addition to one or more of the preceding or following aspects, or in the alternative to some aspects, the extruded pellets can be at a temperature of 100 to 150 degrees Fahrenheit before flaking.

In a twenty-eighth aspect, in addition to one or more of the preceding or following aspects, or in the alternative to some aspects, the operation of extruding can be performed with a screw speed of 200 to 400 RPM.

In a twenty-ninth aspect, in addition to one or more of the preceding or following aspects, or in the alternative to some aspects, the operation of extruding can be performed with a screw speed of 300 to 350 RPM.

In a thirtieth aspect, in addition to one or more of the preceding or following aspects, or in the alternative to some aspects, the operation of extruding can be performed with a barrel temperature of 35 to 40 degrees Celsius.

In a thirty-first aspect, a high-protein flaked food product can be included having a plurality of high-protein flakes, the high-protein flakes can include wheat gluten, wheat protein isolate, and pea protein concentrate, and wherein the high-protein flakes have an average protein content of at least 50% by weight.

In a thirty-second aspect, in addition to one or more of the preceding or following aspects, or in the alternative to some aspects, the high-protein flakes can have an average protein content of at least 50% by weight.

In a thirty-third aspect, in addition to one or more of the preceding or following aspects, or in the alternative to some aspects, the high-protein flakes can have an average protein content of at least 60% by weight.

In a thirty-fourth aspect, in addition to one or more of the preceding or following aspects, or in the alternative to some aspects, the plurality of high-protein flakes can have, on average, a net area that can be at least 85% of an average convex area of the plurality of high-protein flakes.

In a thirty-fifth aspect, in addition to one or more of the preceding or following aspects, or in the alternative to some aspects, the plurality of high-protein flakes can have, on average, a net area that can be at least 95% of the convex area of the plurality of high-protein flakes.

In a thirty-sixth aspect, in addition to one or more of the preceding or following aspects, or in the alternative to some aspects, the plurality of high-protein flakes can have, on average, a net area that can be at least 99% of an average convex area of the plurality of high-protein flakes.

In a thirty-seventh aspect, in addition to one or more of the preceding or following aspects, or in the alternative to some aspects, the wheat protein isolate and the pea protein concentrate can be in a ratio of 2:1 to 1:2 by weight.

In a thirty-eighth aspect, in addition to one or more of the preceding or following aspects, or in the alternative to some aspects, wherein the wheat gluten can be from 26 to 34 wt. % of the high-protein flakes, wherein the wheat protein isolate can be from 21 to 30 wt. % of the high-protein flakes, and wherein the pea protein concentrate can be from 19 to 27 wt. % of the high-protein flakes.

In a thirty-ninth aspect, in addition to one or more of the preceding or following aspects, or in the alternative to some aspects, wherein the wheat gluten can be from 28 to 32 wt. % of the high-protein flakes, wherein the wheat protein isolate can be from 23 to 28 wt. % of the high-protein flakes, and wherein the pea protein concentrate can be from 21 to 25 wt. % of the high-protein flakes.

In a fortieth aspect, in addition to one or more of the preceding or following aspects, or in the alternative to some aspects, the flakes can include dairy protein.

In a forty-first aspect, in addition to one or more of the preceding or following aspects, or in the alternative to some aspects, wherein the plurality of high-protein flakes lack pores greater than 1 mm in diameter.

In a forty-second aspect, in addition to one or more of the preceding or following aspects, or in the alternative to some aspects, the plurality of high-protein flakes can have a bulk density of 96 to 136 g/L.

In a forty-third aspect, in addition to one or more of the preceding or following aspects, or in the alternative to some aspects, the plurality of high-protein flakes can have a bulk density of 108 to 120 g/L.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following FIGURES (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As discussed above, high protein diets have become very popular. Further, even apart from high protein diets, food items with high protein content have become very popular with consumers. However, some food items high protein content may have off-flavors and textures that do not provide the sensory experiences that consumers are looking for. Ready-to-eat breakfast cereals are an extremely popular food, but typically have relatively high amounts of carbohydrates and low amounts of protein.

Embodiments herein include high protein flaked food products, high protein flakes and methods of making the same. High protein flakes herein can include high amounts of protein while still maintaining desirable sensory properties and high levels of flake integrity. Flake integrity can be particularly important with ready-to-eat cereals so that the product does not fall apart during packaging, distribution, sales, storage, and/or handling before consumer end use. Remarkably, the high protein flakes can have an average protein content of at least 50%, 60%, or higher by weight while exhibiting desirable sensory and flake integrity attributes. In various embodiments, the high protein flakes herein can include wheat gluten, wheat protein isolate, and pea protein concentrate, amongst other ingredients.

Figure 1:
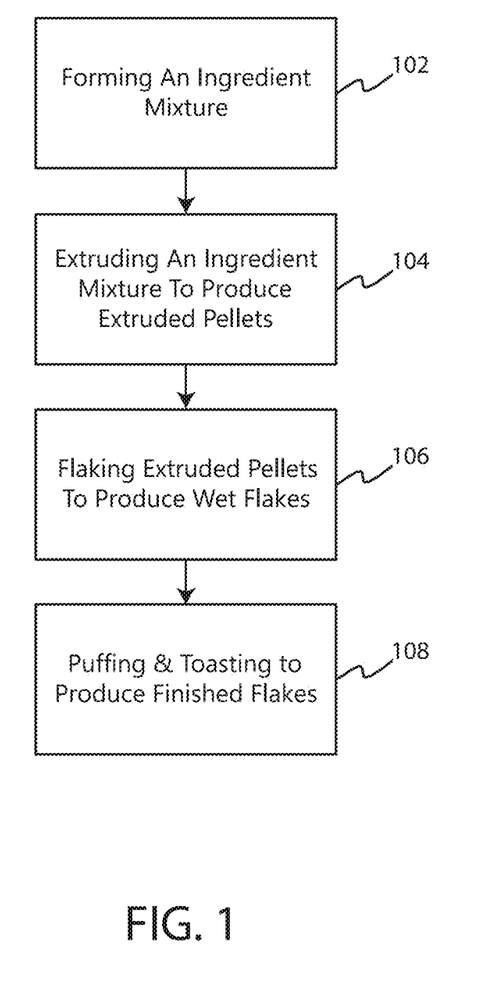
FIG. 1 is a flowchart showing a method of making high protein flakes in accordance with various embodiments herein.

Referring now to FIG. 1, a flowchart is shown illustrating some operations in accordance with various methods of making high protein flakes herein. The method of making high protein flakes can include an operation of forming an ingredient mixture 102. Exemplary components of ingredient mixtures herein are described in greater detail below. However, in various embodiments, the ingredient mixture can include wheat gluten, wheat protein isolate, and pea protein concentrate, amongst other ingredients.

The method of making high protein flakes can also include an operation of extruding an ingredient mixture to produce extruded pellets 104. Various food extrusion systems can be used. The feed rate can vary depending on the system. However, in some embodiments the feed rate can be from 80 to 120 KG/HR, although other rates can also be used. In some embodiments, a water rate can be from 30 to 50 KG/HR, although other rates can also be used. Various die pressures can be used. It will be appreciated that the die pressure used can impact a degree of expansion of the material after it leaves the die. In various embodiments, the die pressure is set so that the degree of expansion is less than 10, 9, 8, 7, 6, 5, 4, 3, 2 or 1 percent by volume, or an amount falling within a range between any of the foregoing. In some embodiments, the die pressure can be from less than 1000 PSI and greater than 100 PSI. In some embodiments, the die pressure can be less than 900, 800, 700, 600, 500, 400 or 300 PSI.

Screw speeds of the extruder can vary depending on the specific extrusion equipment used. In various embodiments, the operation of extruding is performed with a screw speed of 200 to 400 RPM. In some embodiments, the operation of extruding is performed with a screw speed of 300 to 350 RPM. However, in some embodiments screw speeds can be used falling outside those ranges. The barrel temperature of the extruder can be controlled within a specific temperature range. In various embodiments, the operation of extruding is performed with a barrel temperature of 25 to 75 degrees Celsius. In various embodiments, the operation of extruding is performed with a barrel temperature of 35 to 40 degrees Celsius.

The method of making high protein flakes also includes a flaking extruded pellets to produce wet flakes 106 (or high-moisture flakes). In specific, a flaking mill can be used in order to flake extruded pellets. While not intending to be bound by theory, the temperature of the pellets as they enter the flaking operation is significant to the product obtained. Temperatures that are too high may result in a bulk density of the product that is undesirably low. Temperatures that are too low may result in a bulk density of the product that is undesirably high. In various embodiments, the extruded pellets are at a temperature of 80 to 200 degrees Fahrenheit before flaking. In various embodiments, the extruded pellets are at a temperature of 100 to 150 degrees Fahrenheit before flaking.

The roll pressure in the flaking mill can vary. In some embodiments, the roll pressure can be from 1100 to 1400 PSI, however other pressures can also be used herein. In some embodiments, the roll speed can be from 90-110/90-110 RPM, or about 100/100 RPM in some examples, though other roll speeds are contemplated herein. In some embodiments, a rotary feeder speed can be from about 0.6 to 1 RPM, though other rotary feeder speeds are also contemplated herein. It will be appreciated that parameters described herein can vary depending on the scale of production.

The method of making high protein flakes can also include an operation of puffing and toasting the wet flakes to produce finished flakes 108. Puffing and toasting can be performed with an oven. In some embodiments, puffing and toasting can be performed with a rotating drum oven. In some embodiments, puffing and toasting can be performed at an oven temperature of about 330 to 360 degrees Fahrenheit, though other temperatures are also contemplated herein. In some embodiments, the drum speed can be from about 240 to 280 Hz, though other drum speeds are also contemplated herein. In some embodiments, the blower speed can be from about 580 to 620 Hz, though other blower speeds are also contemplated herein.

Other operations may also be performed in accordance with embodiments herein beyond those shown in FIG. 1. For example, in some embodiments, an operation of applying a flavoring or other composition can also be included.

Figure 2:
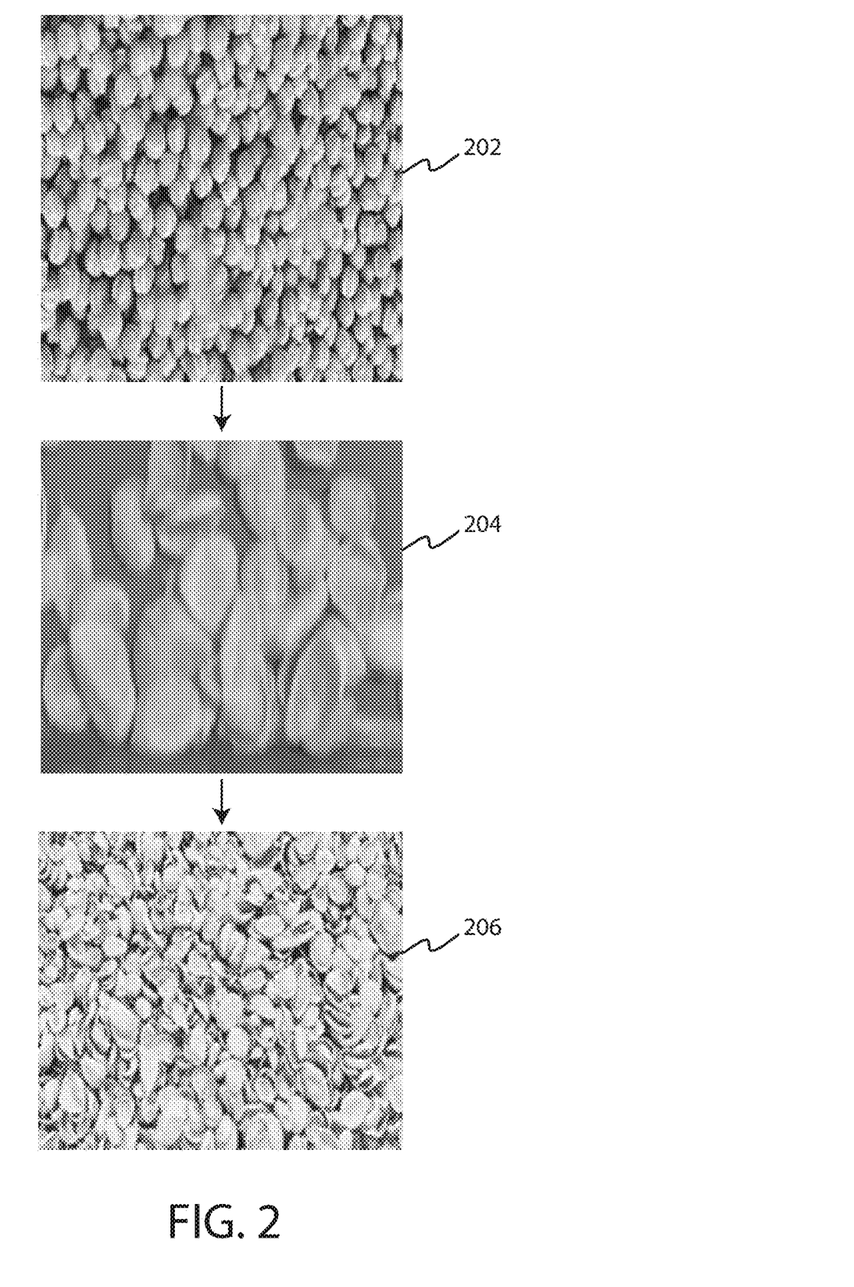
FIG. 2 is a schematic view of intermediate products and finished high protein flakes in accordance with various embodiments herein.

Referring now to FIG. 2, a schematic view of intermediate products and finished high protein flakes in accordance with various embodiments herein. In specific, FIG. 2 shows extruded pellets 202. In various embodiments, the extruded pellets can have a density of 475 to 700 g/L. In various embodiments, the extruded pellets 104 can have a density of 450 to 650 g/L.

The moisture content of the extruded pellets can be an important parameter to control to result in flakes with desirable levels of integrity. The moisture of the extruded pellets is significant as moisture levels that are too low may result in bulk densities of the finished flakes that are too high wherein moisture levels that are too high may result in bulk densities of the finished flakes that are too low. In various embodiments, the extruded pellets have a moisture content of 25 to 30 wt. percent or from 27 to 30 wt. percent.

FIG. 2 also shows exemplary wet flakes 204 as may be produced by a flaking operation herein. Thickness of the wet flakes 204 is an important parameter. Wet flakes that are too thin won't have sufficient integrity as finished flakes. Wet flakes that are too thick can result in difficulties in properly drying the wet flakes. Drying is particularly challenging in the context of high protein flakes as too much heat exposure will result in undesirable browning of the flakes. In various embodiments, the wet flakes 204 can have a thickness of 10 to 35 microns or from 20 to 30 microns. In various embodiments, the wet flakes 204 can have a moisture content of 26 to 31 wt. percent. In various embodiments, the wet flakes 204 can have a moisture content of 26 to 29 wt. percent.

FIG. 2 also shows exemplary finished flakes 206 as may be produced by a puffing and/or toasting operation herein. The finished flakes 206 can have a remarkably high protein content. In various embodiments, the finished flakes (described further below) have a protein content of at least 40, 45, 50, 55, 60, 65, 70 wt. % or higher. In some embodiments, the finished flakes can have a protein content falling within a range between any of the foregoing.

As a non-refrigerated product, the amount of moisture is important to control. In various embodiments, the finished flakes 206 can have a moisture content of 1 to 5 wt. %. In various embodiments, the finished flakes can have a moisture content of 2 to 3 wt. %.

Bulk density provides a measure of the quality and integrity of the finished flakes. If bulk density is too high, it can mean that the finished flakes are too dense and hard. If bulk density is too low, it can mean that the finished flakes may easily break and lack desirable integrity. In various embodiments, the finished flakes herein can have a bulk density of 96 to 136 g/L. In various embodiments, the finished flakes herein can have a bulk density of 108 to 120 g/L.

The finished flakes can include substantial amounts of the ingredients herein contributing to protein content. For example, in various embodiments, the wheat gluten can be from 26 to 34 wt. % of the high protein flakes, the wheat protein isolate can be from 21 to 30 wt. % of the high protein flakes, and the pea protein concentrate can be from 19 to 27 wt. % of the high protein flakes. As another example, the wheat gluten can be from 28 to 32 wt. % of the high protein flakes, the wheat protein isolate can be from 23 to 28 wt. % of the high protein flakes, and the pea protein concentrate can be from 21 to 25 wt. % of the high protein flakes.

The high protein flakes herein can include a perimeter that is highly regular and smooth (e.g., lacking substantial jagged edges). A ratio of net area (or simply area) to convex area of a shape can be used to measure the regularity and smoothness of the perimeter. The convex area of an object is the area of a convex hull or bounding shape that encloses the object. By definition, the convex area is always at least as large as the net area of a shape. The higher the net area relative to the convex area, the less jagged the shape is. In various embodiments, the plurality of high protein flakes can have, on average, a net area that is at least 80%, 85%, 90%, 95%, 98% or 99% of the convex area of the plurality of high protein flakes, or a net area relative to convex area, on average, falling within a range between any of the foregoing.

Pores can be an indication of the integrity of the high protein flakes. In various embodiments, the high protein flakes substantially lack pores greater than 1 mm in diameter.

Ingredient Mixture

Various components contribute to the protein content of the flakes herein. By way of example, flakes herein can include at least wheat gluten, wheat protein isolate, and pea protein concentrate as protein rich ingredients.

The ratios of wheat gluten, wheat protein isolate, and pea protein concentrate can be significant. In various embodiments, the wheat protein isolate and the pea protein concentrate are in a ratio of 2:1 to 1:2 by weight.

The pH of the wheat protein isolate can impact various properties of the isolate impacting the process herein. In specific, it has been found that where the pH of wheat protein isolate is too high (e.g., not sufficiently acidic) then the resulting composition lacks sufficient cohesiveness and the flakes produced do not have sufficient structural integrity. In various embodiments, the wheat protein isolate has a pH of less than 6.0, 5.8, 5.6, 5.4, 5.2, 5.0, 4.8, 4.6, 4.4, 4.2, 4.0 or less, or a pH falling within a range between any of the foregoing.

In some embodiments, the pH of the combination of wheat gluten, wheat protein isolate, and pea protein concentrate (versus just the wheat protein isolate in isolation) can be adjusted to aid in the process herein. In various embodiments, the pH of the combination of wheat gluten, wheat protein isolate, and pea protein concentrate can be less than 6.0, 5.8, 5.6, 5.4, 5.2, 5.0, 4.8, 4.6, 4.4, 4.2, 4.0 or less, or a pH falling within a range between any of the foregoing. In some embodiments, the pH of all components of the flakes can be less than 6.0, 5.8, 5.6, 5.4, 5.2, 5.0, 4.8, 4.6, 4.4, 4.2, 4.0 or less, or a pH falling within a range between any of the foregoing.

Each of the protein rich ingredients serves an important purpose and they work together synergistically to produce flakes with desirable levels of integrity. It has been found that the wheat protein isolate by itself (as a protein rich ingredient) cannot be processed into flakes. Rather, the wheat protein by itself is very sticky. Further, it has been found that the pea protein isolate by itself (as a protein rich ingredient) cannot be processed into flakes with sufficient integrity. Rather, the pea protein isolate results in very weak flakes without sufficient integrity that easily crumble. Further, it has been found that wheat gluten by itself (as a protein rich ingredient) cannot be processed into flakes with sufficient integrity. Rather, the wheat gluten results in very weak flakes without sufficient integrity and a palatable texture. However, when these components are combined in the amounts described herein, flakes can be produced with a palatable texture exhibiting substantial integrity.

The total amounts of the protein rich ingredients can be substantial. In various embodiments, the ingredient mixture can include from 33 to 44 weight percent of the wheat gluten, from 17 to 37 weight percent of the wheat protein isolate, and from 15 to weight percent of the pea protein concentrate, wherein the preceding weight percentages are with respect to a total weight of the wheat gluten, the wheat protein isolate, and the pea protein concentrate. In various embodiments, the ingredient mixture can include from 36 to 41 weight percent of the wheat gluten, from 30 to 34 weight percent of the wheat protein isolate, and from 27 to 32 weight percent of the pea protein concentrate, wherein the preceding weight percentages are with respect to a total weight of the wheat gluten, the wheat protein isolate, and the pea protein concentrate.

In some embodiments, the ingredient mixture can also include dairy based protein. For example, in some embodiments, the ingredient mixture can include 1, 3, 5, 7, 10, 15, 20, 25 or more weight percent (with respect to the total weight of the flaked product) of one or more dairy protein components. Exemplary dairy protein components can include, but are not limited to, whey products, milk products, and other dairy-derived components. Examples of whey products include whey protein concentrates (WPC), whey protein isolates (WPI), and milk-derived whey. Examples of milk products include milk protein concentrates (MPC), milk protein isolates (MPI), and micellar casein.

However, in other embodiments, the ingredient mixture herein (and the resulting finished flakes) is 100% plant derived materials.

In various embodiments, a starch component can also be a part of the ingredient mixture. For example, in various embodiments a pregelatinized or precooked starch can be added to the ingredient mixture. In various embodiments, the pregelatinized or precooked starch can include at least one of a pregelatinized corn starch, a pregelatinized rice starch, a pregelatinized potato flour, a pregelatinized tapioca flour, and a precooked pulse flour.

It will be appreciated that the ingredient mixture herein can include many other specific ingredients. For example, in various embodiments, the ingredient mixture can further include glycerol monostearate. The glycerol monostearate can serve as a processing aid herein, amongst other functions. In some embodiments, other processing aids can also be used. Other components can also be added to the ingredient mixture herein including, but not limited to, sweeteners (such as sugar, *stevia* leaf extract, and the like), flavorings (both natural and artificial), colorings (both natural and artificial), chocolate, cinnamon, vanilla, and the like. In addition, various other components can be added to a high protein flaked food product herein including, but not limited to, nuts, fruits, and the like.

EXAMPLES

Example 1: High Protein Flakes and High Protein Flaked Food Product

Flour formulations are prepared consistent with embodiments herein. The flour formulations are as shown below in Table 2 (wt. % numbers).

TABLE 1

| Ingredients | Abbreviation |
|---|---|
| Wheat Gluten | WG |
| Wheat Protein Isolate | WPI |
| Pea Protein Concentrate | PPC |
| Corn Pregel | CP |
| Salt (NaCl) | Salt |
| Glycerol Monostearate | GM |

TABLE 2

| Formulation | WG | WPI | PPC | CP | Salt | GM |
|---|---|---|---|---|---|---|
| 1 | 25 | 20 | 26 | 26 | 1.5 | 1.5 |
| 2 | 25 | 25 | 24 | 24 | 1 | 1 |
| 3 | 25 | 31 | 20 | 21 | 2 | 1 |
| 4 | 28 | 20 | 25 | 25 | 1 | 1 |
| 5 | 28 | 25 | 23 | 22 | 1 | 1 |
| 6 | 28 | 30 | 19 | 21 | 1.1 | 0.9 |
| 7 | 30 | 20 | 25 | 22 | 1.2 | 1.8 |
| 8 | 30 | 25 | 23 | 20 | 1.2 | 0.8 |
| 9 | 30 | 30 | 20 | 18 | 1 | 1 |
| 10 | 32 | 26 | 22 | 18 | 1 | 1 |
| 11 | 35 | 25 | 20 | 18 | 1.2 | 0.8 |

The flour formulation is then combined with components such as sweetener, water, and flavorings to prepare an ingredient mixture used to make flakes in a manner consistent with the operations shown in FIG. 1.

The flakes themselves can function as a high protein flaked food product herein or can then combined with other components (fruits, nuts, etc.) to form a high protein flaked food product with the flakes representing from 75 to 85 percent by weight of the high protein flaked food product.

Example 2: Effects of Varying Protein Component Amounts on Flake Texture

Figure 3:
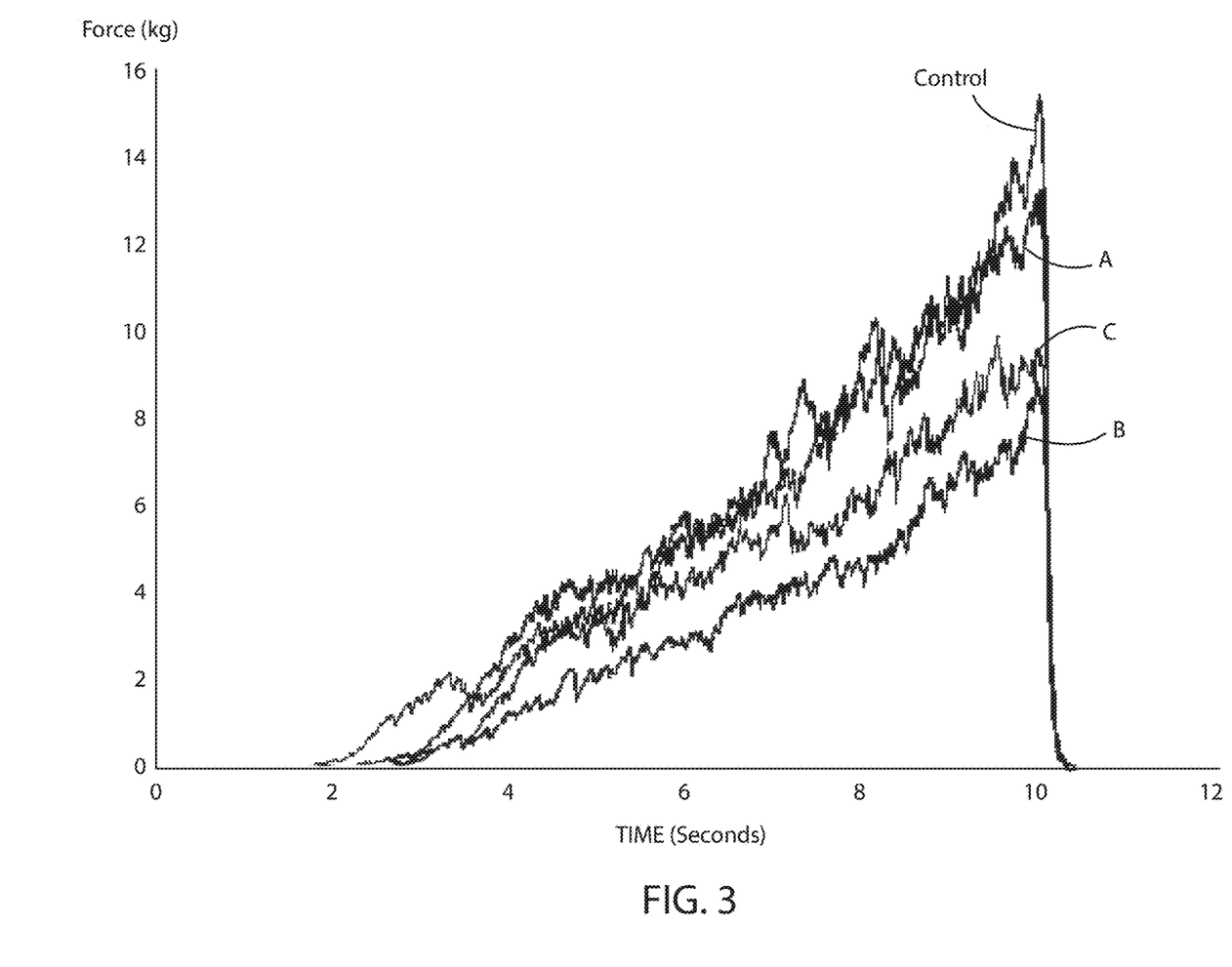
FIG. 3 is a graph showing texture analysis results of different flake formulations.

A Texture Analyzer XT.XTplus™ from Texture Technologies Corp. was used to evaluate finished flakes consistent with the formulations described in Table 2 above (Control) along with three variant formulations including: A.) with twice the amount of wheat protein isolate—roughly 50 wt. %, B.) with twice the amount of pea protein concentrate (roughly 46 wt. %), and C.) with twice the amount of pea protein concentrate (roughly 46 wt. %) along with an increased amount of water. The results are shown in FIG. 3. The results show that the control formulation exhibited the best crispy flake texture.

Example 3: Effects of Pellet Moisture on Flake Texture

Figure 4:
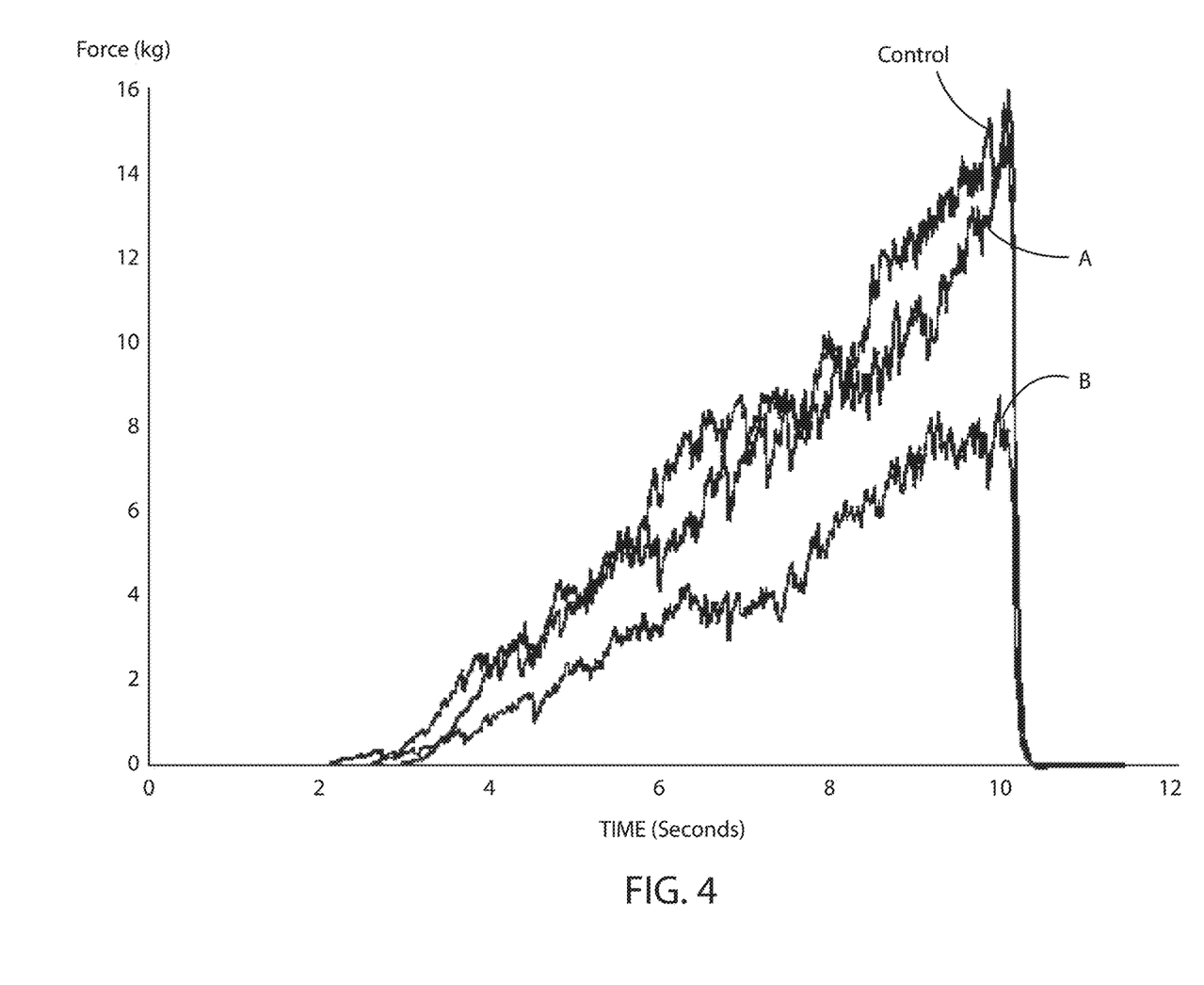
FIG. 4 is a graph showing texture analysis of flakes made from pellets having different moisture contents.

A Texture Analyzer XT.XTplus™ from Texture Technologies Corp. was used to evaluate finished flakes consistent with the formulations described in Table 2 above as made using operations described herein with using three different pellet moisture levels: 30% (Control), 34% (A), and 38% (B). The results are shown in FIG. 4. The results show that the pellets with 30% moisture resulted in the best crispy flake texture.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A method of making protein flakes comprising:
forming an ingredient mixture, the ingredient mixture comprising
wheat gluten;
wheat protein isolate; and
pea protein concentrate;
extruding the ingredient mixture to produce extruded pellets; and
flaking the extruded pellets to produce wet flakes,
the wet flakes having a thickness of 10 to 35 microns.

2. The method of claim 1, wherein the wheat protein isolate and the pea protein concentrate are in a ratio of 2:1 to 1:2 by weight.

3. The method of claim 1, the ingredient mixture comprising dairy protein.

4. The method of claim 1, further comprising adding a pregelatinized or precooked starch to the ingredient mixture.

5. The method of claim 4, the pregelatinized or precooked starch comprising at least one of a pregelatinized corn starch, a pregelatinized rice starch, a pregelatinized potato flour, a pregelatinized tapioca flour, and a precooked pulse flour.

6. The method of claim 1, further comprising puffing and toasting the wet flakes to produce finished flakes.

7. The method of claim 6, wherein the finished flakes have a protein content of at least 50 wt. %.

8. The method of claim 6, the finished flakes having a moisture content of 1 to 5 wt. %.

9. The method of claim 6, the finished flakes having a bulk density of 96 to 136 g/L.

10. The method of claim 1, the ingredient mixture comprising:
from 33 to 44 weight percent of the wheat gluten;
from 17 to 37 weight percent of the wheat protein isolate; and
from 15 to 35 weight percent of the pea protein concentrate; and
wherein the preceding weight percentages are with respect to a total weight of the wheat gluten, the wheat protein isolate, and the pea protein concentrate.

11. The method of claim 1, the extruded pellets having a density of 475 to 700 g/L.

12. The method of claim 1, the extruded pellets have a moisture content of 27 to 30 wt. percent.

13. The method of claim 1, the wet flakes having a moisture content of 26 to 31 wt. percent.

* * * * *